US009740706B2

(12) United States Patent
Cramer et al.

(10) Patent No.: US 9,740,706 B2
(45) Date of Patent: *Aug. 22, 2017

(54) MANAGEMENT OF INTERMEDIATE DATA SPILLS DURING THE SHUFFLE PHASE OF A MAP-REDUCE JOB

(71) Applicant: Zettaset, Inc., Mountain View, CA (US)

(72) Inventors: Michael J. Cramer, San Francisco, CA (US); Brian P. Christian, Santa Cruz, CA (US)

(73) Assignee: ZETTASET, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,182

(22) Filed: Jun. 21, 2016

(65) Prior Publication Data

US 2016/0299919 A1 Oct. 13, 2016

Related U.S. Application Data

(63) Continuation of application No. 13/908,953, filed on Jun. 3, 2013, now Pat. No. 9,424,274.

(51) Int. Cl.
*G06F 17/30* (2006.01)
*G06F 9/50* (2006.01)

(52) U.S. Cl.
CPC ...... *G06F 17/30203* (2013.01); *G06F 9/5061* (2013.01); *G06F 17/3038* (2013.01); *G06F 17/3053* (2013.01)

(58) Field of Classification Search
CPC .......... G06F 17/30203; G06F 17/3038; G06F 17/3053; G06F 9/5061

(Continued)

(56) References Cited

U.S. PATENT DOCUMENTS 6,275,898 B1 8/2001 DeKoning
8,356,050 B1 1/2013 Olston et al.

(Continued)

OTHER PUBLICATIONS

Blanas, Spyros et al., "A Comparison of Join Algorithms for Log Processing in MapReduce", SIGMOD'10, Jun. 6-11, 2010, pp. 1-12, ACM, Indianapolis IN, USA.

(Continued)

*Primary Examiner* — James Trujillo
*Assistant Examiner* — Aida Tessema
(74) *Attorney, Agent, or Firm* — Asif Ghias (57) ABSTRACT

A system and a method for spill management during the shuffle phase of a map-reduce job performed in a distributed computer system on distributed files. A spilling protocol is provided for handling the spilling of intermediate data based on at least one popularity attribute of key-value pairs of the input data on which the map-reduce job is performed. The spilling protocol includes an assignment order to storage resources belonging to the computer system based on the at least one popularity attribute. The protocol can be deployed in computer systems with heterogeneous storage resources. Additionally, pointers or tags can be assigned to improve shuffle phase performance. The distributed file systems that are most suitable are ones usable by Hadoop, e.g., Hadoop Distributed File System (HDFS).

20 Claims, 5 Drawing Sheets

(58) Field of Classification Search
USPC .......................................................... 707/827
See application file for complete search history.

(56) References Cited

U.S. PATENT DOCUMENTS

| | | | |
|---|---|---|---|
| 8,510,538 | B1 | 8/2013 | Malewicz et al. |
| 8,549,518 | B1 | 10/2013 | Aron et al. |
| 2010/0223437 | A1* | 9/2010 | Park ........................ G06F 12/12 711/159 |
| 2011/0154341 | A1* | 6/2011 | Pueyo ................... G06F 9/5066 718/101 |
| 2011/0313973 | A1 | 12/2011 | Srivas et al. |
| 2012/0101991 | A1 | 4/2012 | Srivas et al. |
| 2012/0151292 | A1 | 6/2012 | Rowstron et al. |
| 2012/0191804 | A1 | 7/2012 | Wright et al. |
| 2012/0246643 | A1 | 9/2012 | Chang et al. |
| 2013/0167151 | A1 | 6/2013 | Verma et al. |
| 2013/0254196 | A1 | 9/2013 | Babu et al. |
| 2013/0339966 | A1 | 12/2013 | Meng et al. |
| 2013/0346466 | A1 | 12/2013 | Zhang et al. |
| 2014/0215487 | A1 | 7/2014 | Cherkasova et al. |
| 2014/0359624 | A1 | 12/2014 | Cherkasova et al. |

OTHER PUBLICATIONS

Chen, Fangfei et al., "Joint Scheduling of Processing and Shuffle Phases in MapReduce Systems", Dept. of Computer Science & Engineering, 2012, pp. 1-9, The Penn State Univ. Bell Laboratories, Pennsylvania PA, USA.

Ebbers, Mike et al., "Implementing IBM InfoShere BigInsights on System X", Redbooks, Oct. 2012, pp. 1-228, First Ediction Version 1.4.0.0., International Business Machines Corp website, USA.

Gabriel, Anne Rawland, "Managing the Data Deluge—Enhancing Big Data Analytics in Financial Services with Sold-State Storage", A UBM Techweb White Paper, Sep. 2012, pp. 1-5, LSA Corporation, USA.

Herodotou, Herodotos, "Hadoop Performance Models", Computer Science Department, 2011, pp. 1-19, Duke University, North Carolina, USA.

Intel, "Optimizing Hadoop Deployments", White Paper Cloud Computing, Oct. 2010, pp. 1-8, Version 2.0, Intel Corporation, USA.

Kim, Minwoo et al., "Shuffling Optimization in Hadoop M/R", Team 4, Fall CS492 Course, 2008, pp. 1-13.

Michiardi, Pietro et al., "Hadoop MapReduce in Practice"{, Deutch-Franzosische Sommeruniversitat fur nachwuchswissenschaftler, 2011, pp. 1-4, Cloud Computting: Herausforderungen Und Moglichkeiten, Eurecom.

MIT Press, "Parallel Information Retrieval", Information Retrieval: Implementing and Evaluating Search Engines, 2010, pp. 1-4, MIT Press Article, USA.

Moise, Diana et al., "Optimizing Intermediate Data Management in MapReduce Computations", Cloud CP 2011—1st International Workshop on Cloud Computing Platforms, Apr. 10, 2011, pp. 1-7, Version 1-1, ACM, Salzburg, Austria.

Nicolae, Bogdan et al., "BlobSeer: Next Generation Data Management for Large Scale Infrastructures", inria-005114114 Version 1-24, Aug. 2010, pp. 1-33, Journal of Parallel and Distributed Computer 71,2 (2011).

Seo, Sangwon et al., "HPMR. Prefetching and Pre-shuffling in Shared MapReduce Computation Environment", IERR Xplore, Oct. 2009, pp. 3-8, Korea Advanced Institute of Science and Technology, Korea.

Tasktracker, "HadoopAPI 1.2.1", The Apache Software Foundation, 2009 (15 pages accessed via web on Sep. 18, 2015).

Vernica, Rares et al., "Efficient Parallel Set-Similarity Joins Using MapReduce", Department of Computer Science, University of CA, SIGMOD '10, Jun. 2010, ACM 978-1-4503-0032-2, Indianapolis IN, USA.

* cited by examiner

MANAGEMENT OF INTERMEDIATE DATA SPILLS DURING THE SHUFFLE PHASE OF A MAP-REDUCE JOB

RELATED APPLICATIONS

This application is a Continuation of now allowed U.S. application Ser. No. 13/908,953 filed on Jun. 3, 2013. The above numbered application is incorporated by reference herein in its entirety.

FIELD OF THE INVENTION

This invention relates generally to distributed computer systems and methods for management of data spills during the shuffle phase of a map-reduce job performed in such systems on distributed files, and in particular to the management of such spills using popularity attributes of data that is formatted as key-value pairs and to the use of pointers or tags to the intermediate data stored in the system's storage resources.

BACKGROUND ART

Advances in computer networks and their connectivity have resulted in increased popularity of distributed computer systems. Such systems permit a user operating a low-performance local machine to leverage the vast resources of computer clusters and grids that make up a typical distributed computer system. The computers or machines in such distributed systems are conventionally referred to as nodes.

In particular, the user can access data in the network and perform computationally intensive operations on it. Frequently, the data that is processed in such distributed environments is also spread across the nodes belonging to the network. In other words, the data is stored across various storage resources available to the network nodes in the form of a distributed file system (DFS).

One approach to handling vast amounts of distributed information for large-scale data analytics involves the use of batch jobs. Of these, the most popular are map-reduce jobs that are supported within Hadoop clusters. Map-reduce is a relatively young framework that allows a user to specify a processing logic by designing their own map and reduce operations or functions. The map and reduce operations can be written in a general-purpose language (e.g., Java or Python). This makes the framework relatively user-friendly.

A map-reduce job is performed on input files that exhibit a certain minimum structure. In particular, suitable input files are commonly formatted in key-value pairs. The value portion of each pair is usually some static data, i.e., not a program, and it may contain logs, database entries or general list entries.

Map-reduce itself consists of several phases. A job tracker that runs on the cluster's master node manages the entire map-reduce job. During the map phase, the input data in the form of key-value pairs is split into a number of data splits. The splits are scheduled by a task tracker to map nodes. The latter apply the user-defined map operations to the splits. Generally, the map operations are run in multiple waves and they produce a large amount of intermediate data. Many operations, such as collect, spill and merge have to be performed, frequently in multiple rounds, during the map phase to deal with the large amounts of intermediate data generated in applying the map operation over large amounts of input data. All of these operations constitute the pre-shuffle phase of a map-reduce job.

In the next phase, which is most frequently referred to as the shuffle phase, the intermediate data is transferred from the map nodes to reduce nodes. The shuffle phase is the most intense period of network traffic and is typically an all-to-all (or many-to-many) type operation. In fact, the shuffle phase often stresses the bandwidth of the network interconnections.

The final phase of map-reduce involves merging the sorted fragments of intermediate data obtained from the different map nodes to form the input for the reduce nodes. The latter apply the user-specified reduce operation to this input to produce the final output data. The typical output is in the form of a list that may be further compressed and written back to the DFS (e.g., Hadoop DFS or HDFS).

Many skilled artisans have recognized that it is the shuffle phase, rather than the pre- and post-shuffle phases, that presents a bottleneck in the map-reduce framework. For this reason, many of them have studied this phase and proposed various methods for quantifying the dataflow and ameliorating the intense traffic. For example, Herodotou H., "Hadoop Performance Models", Technical Report, Duke University CS Dept., May 2011, pp. 1-19 teaches a number of mathematical performance models for describing the execution of map-reduce jobs on Hadoop. The goal is to estimate performance and find optimal configuration settings when running map-reduce jobs.

Furthermore, methods for optimizing the management of intermediate data in map-reduce jobs are also discussed by Moise D., et al., "Optimizing Intermediate Data Management in MapReduce Computations", CloudCP 2011, $1^{st}$ Intl. Workshop on Cloud Computing Platforms, ACM SIGOPS Eurosys 11 Conference, Apr. 1, 2011. The same group also teaches the application of BlobSeer as a tool for storage backend in map-reduce jobs to enable higher throughput. The corresponding teaching is provided by Nicolae B., et al., "BlobSeer: Next Generation Data Management for Large Scale Infrastructures", Journal of Parallel and Distributed Computing, 71, 2, Aug. 24, 2010, pp. 168-184. Still others teach alternative methods for pre-fetching and/or pre-shuffling of data in order to alleviate the traditional network traffic bottlenecks encountered during the shuffle phase of map-reduce.

Yet another approach to optimizing the shuffle phase involves making an appropriate selection of storage resources for the intermediate data. Such selection, as noted by others, becomes especially important when the storage resources available to the cluster are heterogeneous. In response to this problem, Kim M. and Shim K., "Shuffling Optimization in Hadoop M/R", Fall CS 492 Presentation, South Korea, Dec. 15, 2008, pp. 1-13 teach the addition of an in-memory file system for storing certain intermediate data. In other words, rather than writing that intermediate data to a local disk file system, it is kept in an in-memory file system.

Although much effort has been devoted to finding methods for managing intermediate data during the shuffle phase, there is a need for further improvement. Many of the present solutions present speed-ups of just a few percent and encounter limitations when implemented in practice on data of various degrees of importance or popularity.

Objects And Advantages of the Invention

In view of the shortcomings of the prior art, it is an object of the invention to provide a method and a distributed computer system that is configured for managing intermediate data spills during the shuffle phase of a map-reduce job based on the popularity of the input data presented in the form of key-value pairs. More specifically, it is an object of the invention to leverage the popularity attributes of intermediate data obtained from processing popular key-value pairs to obtain more useful partial results of a map-reduce job that is still in progress.

It is another object of the invention to implement appropriate pointers or tags to intermediate data spilled into the storage resources of the distributed computer system to reduce traffic load during the shuffle phase.

These and many other objects and advantages of the invention will become apparent from the ensuing description.

SUMMARY OF THE INVENTION

The objects and advantages of the invention are accrued by a system and a method for spill management during the shuffle phase of a map-reduce job that is performed in a distributed computer system on distributed files. The method calls for identifying key-value pairs (ki,vi) belonging to the distributed files and performing a pre-shuffle phase of the map-reduce job on those key-value pairs (ki,vi). The pre-shuffle phase is carried out by a number of map nodes of the distributed computer system and it generates keyed partitions (Ki,RPTj) from the key-value pairs (ki,vi).

In accordance with the method of invention, a spilling protocol is provided for handling the spilling of the keyed partitions (Ki,PRTj) over storage resources of the distributed computer system. Specifically, the spilling protocol is based on at least one popularity attribute of the key-value pairs (ki,vi) involved in the map-reduce job. The spilling protocol is provided to a number of reduce nodes of the distributed computer system to enable them to locate and access the keyed partitions (Ki,PRTj) during the shuffle phase that follows the pre-shuffle phase. The shuffle phase is followed by a post-shuffle phase that is performed to produce an output list of the map-reduce job.

The spilling protocol of the invention includes an assignment order to the storage resources available to the distributed computer system. The assignment order is based on the at least one popularity attribute of the key-value pairs (ki,vi) involved in the map-reduce job. In a preferred embodiment, the popularity attribute is assigned by a search-ranking algorithm, which can be embodied by the Apache Lucene protocol deployed by search engines. In particular, the key-value pairs (ki,vi) with the highest search ranking assigned by the search-ranking algorithm are spilled to the fastest storage resources available among the storage resources that are available to the distributed computer system.

The storage resources themselves include heterogeneous storage resources that are recognized as block storage devices by the distributed computer system. Suitable heterogeneous storage resources can include two or more of any suitable members of a large group of candidates. For example, they can include mass storage device interfaced via Serial ATA (SATA), Hard Disk Drives (HDD), Redundant Arrays of Independent Disks (RAID), Solid State Drives (SSD), optical drives, Cloud, tape and other general block storage devices. The spilling protocol assigns the keyed partitions (Ki,PRTj) that are obtained in the pre-shuffle phase from processing the most popular key-value pairs (ki,vi) based on the at least one popularity attribute to two or more of these block storage devices by assigning a tag. The tag has in it a Logical Unit Number (LUN) of the keyed partitions (Ki,PRTj) in the block storage devices where these keyed partitions (Ki,PRTj) are actually stored. Thus, the tag serves the function of a pointer that allows any reduce node to locate the keyed partitions (Ki,PRTj). The reduce node that actually needs to access any specific keyed partition (Ki,PRTj) in the post-shuffle phase can use the tag to do so.

Various distributed file systems can take advantage of the method of invention. Preferably, the distributed file system is one that is usable by Hadoop. Furthermore, it is preferable that the spilling protocol be managed by a task tracker rather than the job tracker of the map-reduce job. The task tracker can assign the pointers or tags that include the LUNs referring to the corresponding storage resources that hold the keyed partitions (Ki,PRTj) related to the most popular key-value pairs (ki,vi).

A fast connection should be provided between at least some of the storage resources and the reduce nodes. In particular, the fast connections should be provided to the storage resources that include the block storage devices where keyed partitions (Ki,PRTj) related to the most popular key-value pairs (ki,vi) are stored.

The system of the invention can be deployed in any computer cluster or clusters that support distributed file systems. For example, computer clusters running the Hadoop Distributed File System (HDSF) are suitable candidates.

The present invention, including the preferred embodiment, will now be described in detail in the below detailed description with reference to the attached drawing figures.

DETAILED DESCRIPTION

The drawing figures and the following description relate to preferred embodiments of the present invention by way of illustration only. It should be noted that from the following discussion, alternative embodiments of the methods and systems disclosed herein will be readily recognized as viable options that may be employed without departing from the principles of the claimed invention. Likewise, the figures depict embodiments of the present invention for purposes of illustration only. One skilled in the art will readily recognize from the following description that alternative embodiments of the methods and systems illustrated herein may be employed without departing from the principles of the invention described herein.

Figure 1:
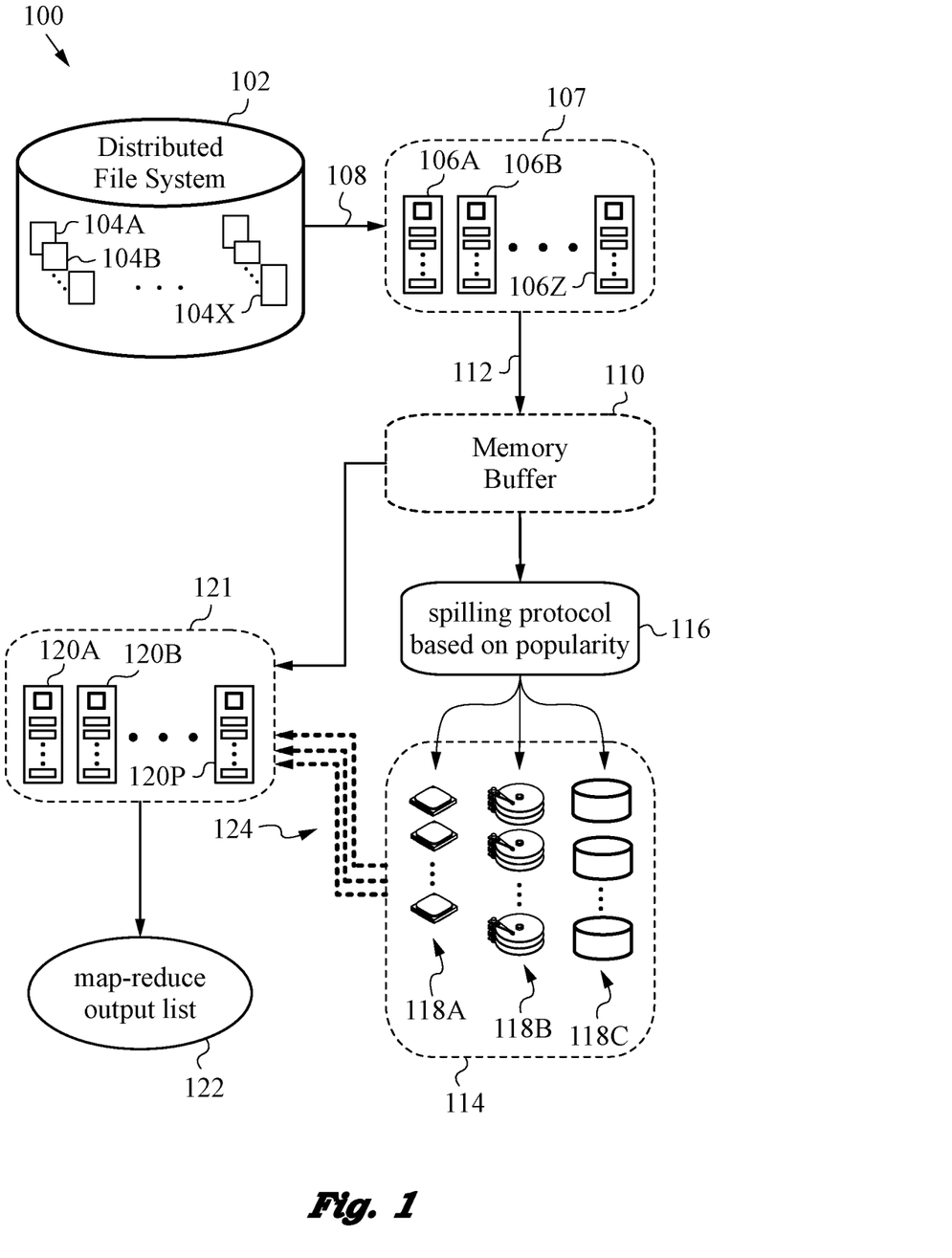
FIG. 1 is a high-level diagram of a distributed computer system with a distributed file system configured for spill management according to the invention.

The present invention will be best understood by initially referring to the high-level diagram of FIG. 1. This drawing figure illustrates a distributed computer system 100 configured for spill management in accordance with the invention.

It is understood that computer system 100 can be distributed among many individual computers, referred to as nodes, which together can form a cluster or several geographically separate clusters. In FIG. 1 only certain nodes of system 100 will be explicitly identified for reasons of clarity.

Distributed computer system 100 supports a distributed file system (DFS) 102. DFS 102 can be spread across any number of collocated or geographically separated nodes. For reasons of clarity, DFS 102 is indicated in FIG. 1 as a single storage unit holding many distributed files 104A, 104B, . . . 104X. It will be appreciated by those skilled in the art that files 104A, 104B, . . . 104X may include different data, partially overlapping data and sometimes even duplicate data. In addition, storage unit 102, and in particular files 104A, 104B, . . . 104X belonging to it are actually distributed among any number of nodes of system 100.

In any particular map-reduce job, system 100 designates a number of map nodes 106A, 106B, . . . , 106Z from among its many nodes for the map phase. Map nodes 106A, 106B, . . . , 106Z are typically slave nodes and are collectively designated by reference 107. Map nodes 106A, 106B, . . . , 106Z, sometimes also called mappers, are tasked with applying a user-specified map operation or function to any number of relevant files chosen from among distributed files 104A, 104B, . . . 104X. An arrow 108 generally indicates the connection required between map nodes 106A, 106B, . . . , 106Z and DFS 102 for applying the map operation. Of course, some of map nodes 106A, 106B, . . . , 106Z may actually be the same nodes that store portions of DFS 102 in their storage resources.

A memory buffer 110 is available to map nodes 106A, 106B, . . . , 106Z for assisting in the mapping process. Specifically, buffer 110 is connected to nodes 106A, 106B, . . . , 106Z as indicated by arrow 112 to allow for sorting, combining and compressing data generated during the map operation.

Buffer 110 is further connected to storage resources 114 for storing data spills, referred by those skilled in the art as simply spilling of data produced during the map operation. Storage resources 114 are any designated data storage units belonging to distributed computer system 100. Preferably, resources 114 are heterogeneous, meaning that they consist of different types of storage devices. Preferably, all resources 114 are recognized and treated as block storage devices by distributed computer system 100. FIG. 1 illustrates just a few of the possible members of the large group of candidate block storage devices. Specifically, block storage devices 118A are solid state drives (SSDs), block storage devices 118B are hard disk drives (HDDs), block storage devices 118C are redundant arrays of independent disks (RAIDs). Still other suitable block storage devices, which are not explicitly shown in FIG. 1 but represent clear alternatives for those skilled in the art include Serial ATA (SATA), optical drives, the Cloud, tape and other general block storage devices.

In the present invention, the spilling of data from the map operation performed by map nodes 106A, 106B, . . . , 106Z is performed in accordance with a spilling protocol 116 that is based on at least one popularity attribute of the data on which the map-reduce job is being run. More specifically, spilling protocol 116 presents an assignment order to storage resources 114 based on at least one popularity attribute of the data on which the batch job embodied by map-reduce is being performed. It should be noted that the portion of the map-reduce job performed up to the point of spilling data from the map operation applied by map nodes 106A, 106B, . . . , 106Z over storage resources 114 as prescribed by spilling protocol 116 represents a pre-shuffle phase of the entire map-reduce job.

Distributed computer system 100 also designates a number of reduce nodes 120A, 120B, . . . , 120P from among its many nodes for the reduce phase. Reduce nodes 120A, 120B, . . . , 120P are typically slave nodes collectively designated by reference 121. Reduce nodes 120A, 120B, . . . , 120P, sometimes also called reducers, are tasked with locating and accessing the data from the pre-shuffle phase as well as reducing that data to provide an output list 122 of the map-reduce job. In the process of locating and accessing the data, reduce nodes 120A, 120B, . . . , 120P must be able to find all the relevant data which includes data spilled over storage resources 114. This portion of the map-reduce job is the most network intensive part. It involves all-to-all communications between reduce nodes 120A, 120B, . . . , 120P and all storage resources 114, i.e., all block storage devices 118A, 118B, 118C. This intensive network traffic stage, referred to as the shuffle phase of the map-reduce job, is indicated by dashed arrows 124.

Output list 122 is generated by reduce nodes 120A, 120B, . . . , 120P after the shuffle phase. We refer to that phase as a post-shuffle phase of the map-reduce job. Output list 122 is the desired final product or result of running the map-reduce job. The map-reduce job run on distributed computer system 100 and the manner in which data in distributed file system 102 is processed, including tracking of its at least one popularity attribute used by spilling protocol 116 will now be described in detail.

Figure 2:
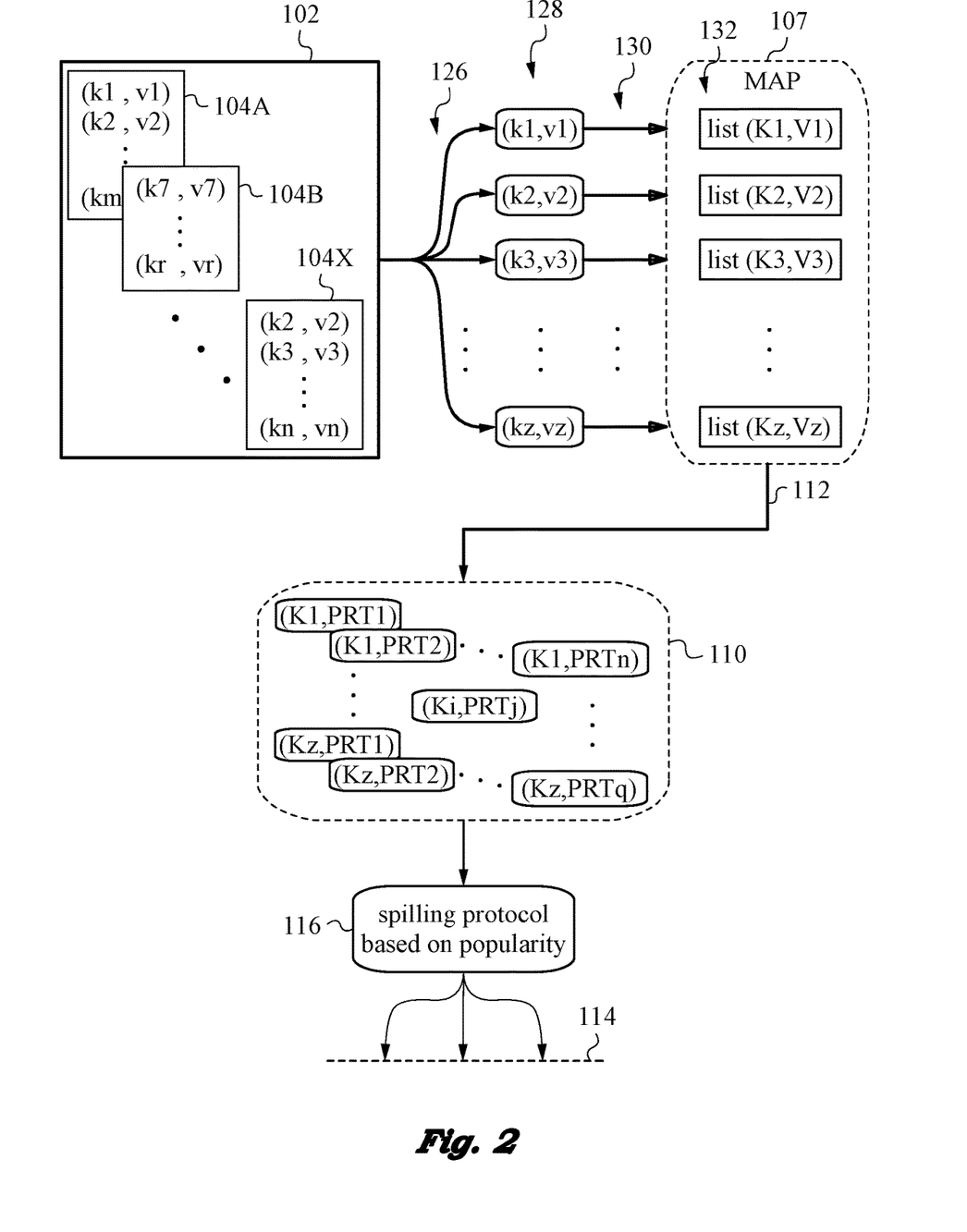
FIG. 2 is a diagram illustrating the pre-shuffle phase of a map-reduce job that generates keyed partitions spilled in accordance with a spilling protocol according to the invention in the distributed computer system of FIG. 1.

FIG. 2 is a diagram illustrating in more detail the pre-shuffle phase of a map-reduce job run on distributed computer system 100. As shown in this diagram, distributed files 104A, 104B, . . . 104X of DFS 102 contain data organized in pairs. Specifically, the data on which a batch job such as map-reduce is run are organized in key-value pairs. File 104A contains key-value pairs (k1,v1), (k2,v2), . . . , (km,vm). Meanwhile, file 104B contains key-value pairs (k7,v7) through (kr,vr) and file 104X has key-value pairs (k2,v2), (k3,v3), . . . , (kn,vn). Note that some overlap in key-value pairs exists between files 104A, 104B, 104X.

Data formatted in key-value pairs is a very fundamental representation in computing systems and applications. Any key-value pair belonging to distributed files 104A, 104B, . . . , 104X will be generally referred to herein as (ki,vi). Such pair contains the key (ki), which is typically an attribute that includes a designation or description of the type of data, and the corresponding value (vi), or the data contents. For example, the key may indicate that the data is for the city of New York in the year 2012, and the value are the numerical temperature readings on each day in 2012.

In a typical embodiment, a job tracker, which is a well-known process that typically runs on a master node (not shown) of computer system 100, implements the map-reduce job specified by the user. Specifically, the job tracker supervises the distribution of specific files from DFS 102. In other words, once the map-reduce job is entered by the user, the job tracker identifies which distributed files 104A, 104B, . . . , 104X contain data, i.e., key-value pairs (ki,vi), that need to be submitted for the map-reduce job. The qualifying data is split, as designated by reference 126 into segments or splits 128 that are grouped together based on the values of the keys (ki) of the key-value pairs (ki,vi).

After being split into splits 128, key-value pairs (ki,vi) contained in each segment are read into the map nodes 107 (individual map nodes 106A, 106B, . . . , 106Z making up the set of map nodes 107 are explicitly shown in FIG. 1), as indicated by reference 130. The step of reading the map inputs is followed by application of the map operation by map nodes 107. The application of map operations to the key-value pairs (ki,vi) produces related lists. The latter constitute intermediate data 132 and are further designated in FIG. 2 as lists—namely "list (Ki,Vi)". Upper case letters are used in the lists in order to keep track of their relationship to the original key-value pairs (ki,vi) from which they were generated by the mapping operation.

Persons of average skill in the art will be familiar with permissible map operations and all the possible types of lists they can produce. Furthermore, the various types of intermediate results stored and processed in memory buffer 110 are also known to those skilled in the art. Thus, the overall map operation itself as well as the various resulting lists and the specific serialization, sorting, collecting and compressing algorithms, frequently referred to as intermediate data processing by those skilled in the art, will not be discussed in detail herein in order not to detract from the fundamental aspects of the present invention. The portions of intermediate data that we are interested in here, are keyed partitions (Ki,PRTj) generated in the pre-shuffle phase.

Before proceeding, we recall that map nodes 107 are generally slave nodes designated by the master node of computer system 100. Map nodes 107 normally run their own task trackers, which are sub-ordinate to the job tracker running on the master node and overseeing the entire map-reduce job. In the subsequent step of the invention, which involves spilling protocol 116 that handles keyed partitions (Ki,PRTj), it is preferable that it be the task trackers of map nodes 107, rather than the job tracker, that manage the implementation of spilling protocol 116.

Thus, after map nodes 107 perform their map operations on the key-value pairs (ki,vi) the intermediate data in the form of keyed partitions (Ki,PRTj) is generated. In FIG. 2, several specific keyed partitions associated with (K1) and (Kz) are shown already in memory buffer 110 after any requisite intermediate data processing steps. In general, we will refer to keyed partitions as (Ki,PRTj).

Notice that a large number of keyed partitions (Ki,PRTj) are typically generated for each (Ki). In any map-reduce job operating on large numbers of key-value pairs (ki,vi) keyed partitions (Ki,PRTj) are too large to keep in memory buffer 110. They need to be moved to local disk prior to shuffle and post-shuffle phases. This process is called spilling.

In accordance with the invention, the spill is managed by spilling protocol 116. As already remarked above, it is preferable that task trackers of map nodes 107 not only be provided with spilling protocol 116, but that they manage spilling protocol 116 that is applied to keyed partitions (Ki,PRTj). Spilling protocol 116 includes an assignment order of keyed partitions (Ki,PRTj) to storage resources 114 available to distributed computer system 100. In particular, spilling protocol for spilling of the keyed partitions (Ki,PRTj) over storage resources 114 is based on at least one popularity attribute of key-value pairs (ki,vi) that are the input to the map-reduce job. More specifically still, assignment order is based on at least one popularity attribute of the key-value pairs (ki,vi) as determined prior to the map-reduce job.

For example, key-value pairs (ki,vi) with most search hits in a pre-defined time period prior to the execution of the map-reduce job are assigned the highest popularity attribute. Alternatively, key-value pairs (ki,vi) with the highest relevance ranking to a specific topic of interest are assigned the highest popularity attribute. In still other embodiments, key-value pairs (ki,vi) that are most used in computations are assigned the highest popularity attribute. In yet other embodiments, key-value pairs (ki,vi) obtained from the most trusted data sources are assigned the highest popularity attribute. Of course, the assignment of the popularity attribute can be numerical (e.g., number 10 for the highest ranking and 0 for the lowest) or binary (e.g., "popular" and "not popular"). Finally, in accordance with the invention two or more popularity attributes can be combined to obtain a total or joint popularity attribute value. In any event, the popularity attribute or attributes are used to manage the spilling of keyed partitions (Ki,PRTj) derived from the popular key-value pairs (ki,vi) during the map-reduce job.

In a preferred embodiment, the at least one popularity attribute is assigned by a search-ranking algorithm. The Apache Lucene protocol deployed by conventional search engines is an example of a search-ranking protocol that can be used in assigning popularity to key-value pairs (ki,vi). In particular, keyed partitions (Ki,PRTj) obtained from the key-value pairs (ki,vi) with the highest search ranking assigned by Lucene are spilled to the fastest storage devices available among the storage resources 114 that are available to distributed computer system 100.

Turning back to FIG. 1, we note that the fastest among storage resources 114 available to computer system 100 are SSDs 118A (see FIG. 1). Thus, in the present embodiment, keyed partitions (Ki,PRTj) obtained from the most popular key-value pairs (ki,vi) are spilled to SSDs 118A. In contrast, spilling protocol 116 assigns keyed partitions (Ki,PRTj) obtained from the least popular key-value pairs (ki,vi) to be spilled to slowest among storage devices 114. In the present embodiment, the slowest devices are HDDs 118B.

Spilling protocol 116 is also provided to reduce nodes 121 of distributed computer system 100 to enable them to locate and access keyed partitions (Ki,PRTj) during the shuffle phase that follows the pre-shuffle phase. Thus, during the intensive shuffle phase reduce nodes 121 can locate and access keyed partitions (Ki,PRTj) in storage resources 114 to perform their reduce tasks.

The shuffle phase is followed by a post-shuffle phase. During the post-shuffle phase reduce nodes 121 perform functions that produce output list 122 of the map-reduce job. More precisely, reduce nodes 121 merge the sorted map outputs, apply the reduce operation and write the outputs in accordance to rules known to those skilled in the art. The final product is output list 122, which is usually sent or written back to DFS 102.

Spilling of intermediate data according to popularity is very advantageous. That is because in many cases partial results for batch jobs such as map-reduce can be obtained from reduce nodes 121 before the entire job is completed. Since partial results are very likely to contain results based on the most popular key-value pairs (ki,vi), a preview of the partial results can be a very useful gauge of the progress of a long map-reduce job. In some cases, this is analogous to obtaining partial results in a general election from the states that are known to be crucial to the overall election. Knowledge of these partial results, even before the complete tally is available, can enable forecasters to get an early indication of what the final result is likely to be.

Figure 3:
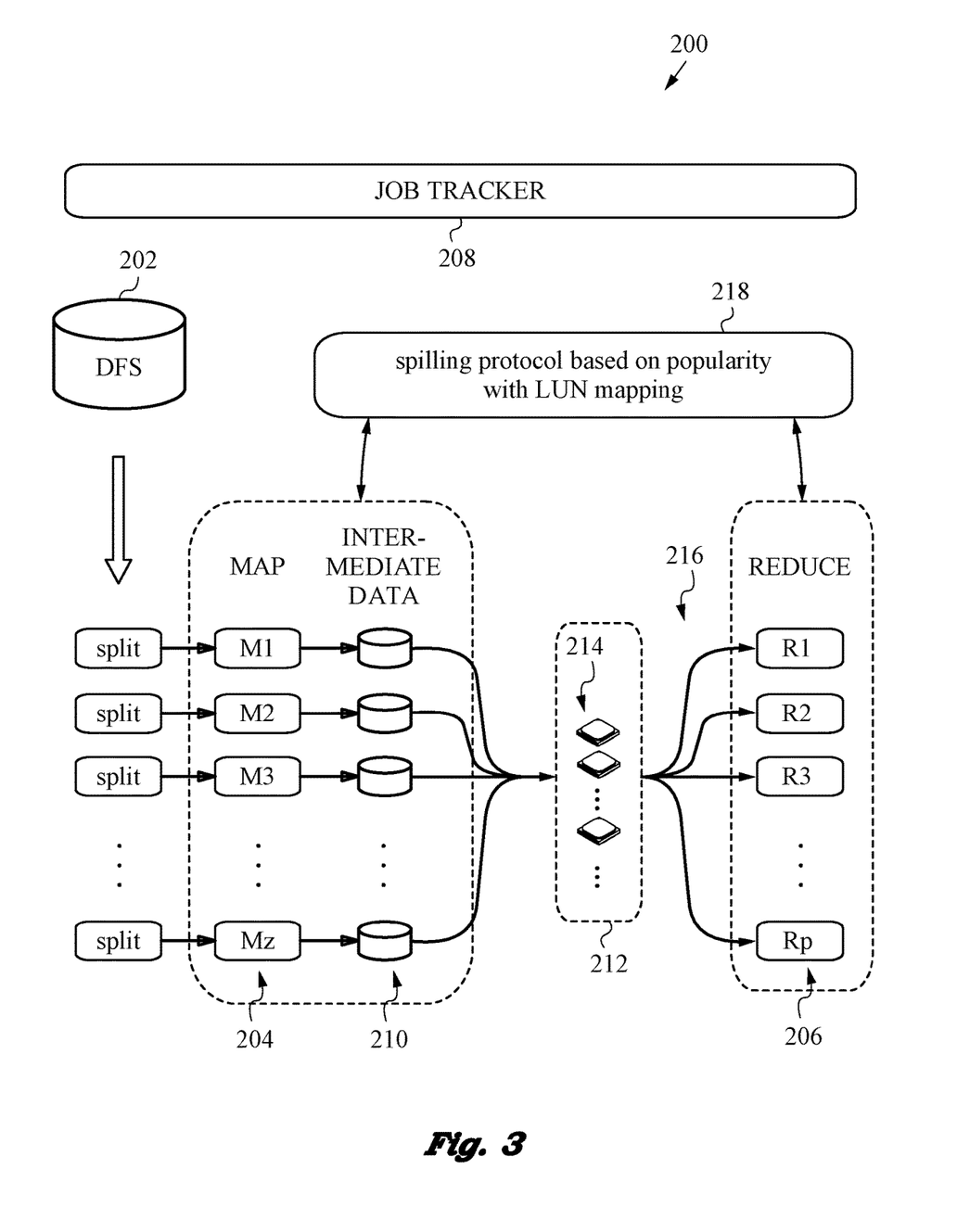
FIG. 3 is a diagram illustrating a distributed computer system deploying a spilling protocol with tag assignments in accordance with the invention.

In order to reduce the traffic during the shuffle phase, it is desirable to introduce pointers or tags to the intermediate data. FIG. 3 is a diagram of another distributed computer system 200 where appropriate pointers or tags are used. Computer system 200 is shown in a manner that is more simplified in comparison to computer system 100 of FIG. 1 in order to not detract from the important aspects of the present invention.

Computer system 200 has a distributed file system 202 (DFS). In the present embodiment, DFS 202 is a Hadoop DFS or HDFS. It should be noted that although various distributed file systems can take advantage of the method of invention a preferred distributed file system is one that is usable by Hadoop.

Computer system 200 has a number of map nodes 204 and a number of reduce nodes 206. Map nodes 204 and reduce nodes 206 are assigned by a job tracker 208 that oversees the overall processing of the map-reduce job. Individual map nodes 204 are referenced as M1, M2, ..., Mz and individual reduce nodes 206 are referenced as R1, R2, ..., Rp. It should be remarked that in typical map-reduce jobs the number of reduce nodes 206 tends to be considerably smaller than the number of map nodes 204.

Map nodes 204 have accessible to them a set of storage resources 210 where intermediate data generated during the pre-shuffle phase is placed. Storage resources 210 can include buffer memory and other local memory resources available to map nodes 204. Intermediate data in storage resources 210 are not explicitly labeled in FIG. 3, but are understood to include all types of intermediate data discussed above.

Computer system 200 is further equipped with a high performance memory array embodied here by a Storage Area Network 212 (SAN) that includes a number of SSDs 214. SAN 212 is a dedicated network that provides access to consolidated, block level data storage for the intermediate data sent from storage resources 210. Furthermore, reduce nodes 206 are connected by connections 216 to obtain intermediate data consolidated to SAN 212 directly from SAN 212.

A spilling protocol 218 is also provided. Spilling protocol 218 is available to map nodes 204 and reduce nodes 206 as shown. Furthermore, it is the task trackers of the map-reduce job that implement spilling protocol 218, as discussed above.

In accordance with the present invention, the shuffle phase of a map-reduce job is further optimized in the Hadoop framework by providing reduce nodes 206 with pointers or tags to intermediate data located in SAN 212. It should be noted that in the preferred embodiment, the tags are implemented in combination with a spilling protocol 218 that assigns intermediate data to storage resources based on at least one popularity attribute, as discussed above.

According to this aspect of the invention, system 200 and the method it implements maximizes (or at least significantly enhances) the overall input-output (IO) potential performance between map nodes 204 and reduce nodes 206 in the map-reduce dataflow model. Any map node from among nodes 204 configures itself to store intermediate data on SAN 212. More precisely, any slave node, i.e., map node 204 running a mapper task can configure itself to save intermediate mapper data on SAN 212. A 'mapred.local.dir' property in core-default.xml file can be configured to point to a directory which is mounted to SAN 212, for example "/mnt/shared". This folder can be used as storage for temporary map-reduce files and mapper output that jointly constitute the intermediate data.

Upon request from any particular reduce node from among reduce nodes 206 for the intermediate data block, the corresponding map node 204 replies with a pointer or tag that indicates the location of the requested intermediate data block in SAN 212. Thus, during the shuffle phase when any particular reduce node among nodes 206 notices that some map tasks are completed, it can remotely download the region files (according to the assigned reducer index) from map nodes from among nodes 204 that have completed their mapping tasks. Normally, the shuffle phase produces a lot of inter-node traffic and is bounded by network input/output bandwidth capacity or simply network IC. The deployment of SAN 212 optimizes the shuffle phase since it stores intermediate files and thus offloads the resources of map nodes 204.

For example, intermediate data based on popular key-value pairs will be stored in SSDs 214 of SAN 212 in order to be accessible very quickly. Thus, the corresponding tag will point to the location of the intermediate data in the corresponding SSD. The reduce node that needs this intermediate data to complete its task, will obtain the tag and then connect directly to storage device in SAN 212 and download the required data block where the intermediate data it needs is stored. Thus, in contrast to the typical situation, where at the start of a reduce task its input is scattered in many files across all the nodes where map tasks ran, now the intermediate data is consolidated in SAN 212.

More precisely, it is preferable that spilling protocol 218 assign the intermediate data in the form of keyed partitions (Ki,PRTj) that are obtained in the pre-shuffle phase from processing the most popular key-value pairs (ki,vi) based on the at least one popularity attribute to two or more of these block storage devices in SAN 212 by assigning the tag. Preferably, the tag has in it a logical unit number (LUN) of the keyed partitions (Ki,PRTj) in the block storage devices belonging to SAN 212 where these keyed partitions (Ki, PRTj) are stored. Thus, the tag serves the function of a pointer that allows any of reduce nodes 206 to locate the keyed partitions (Ki,PRTj). The reduce node that actually needs to access any specific keyed partition (Ki,PRTj) in the post-shuffle phase can use the tag to do so.

Figure 4:
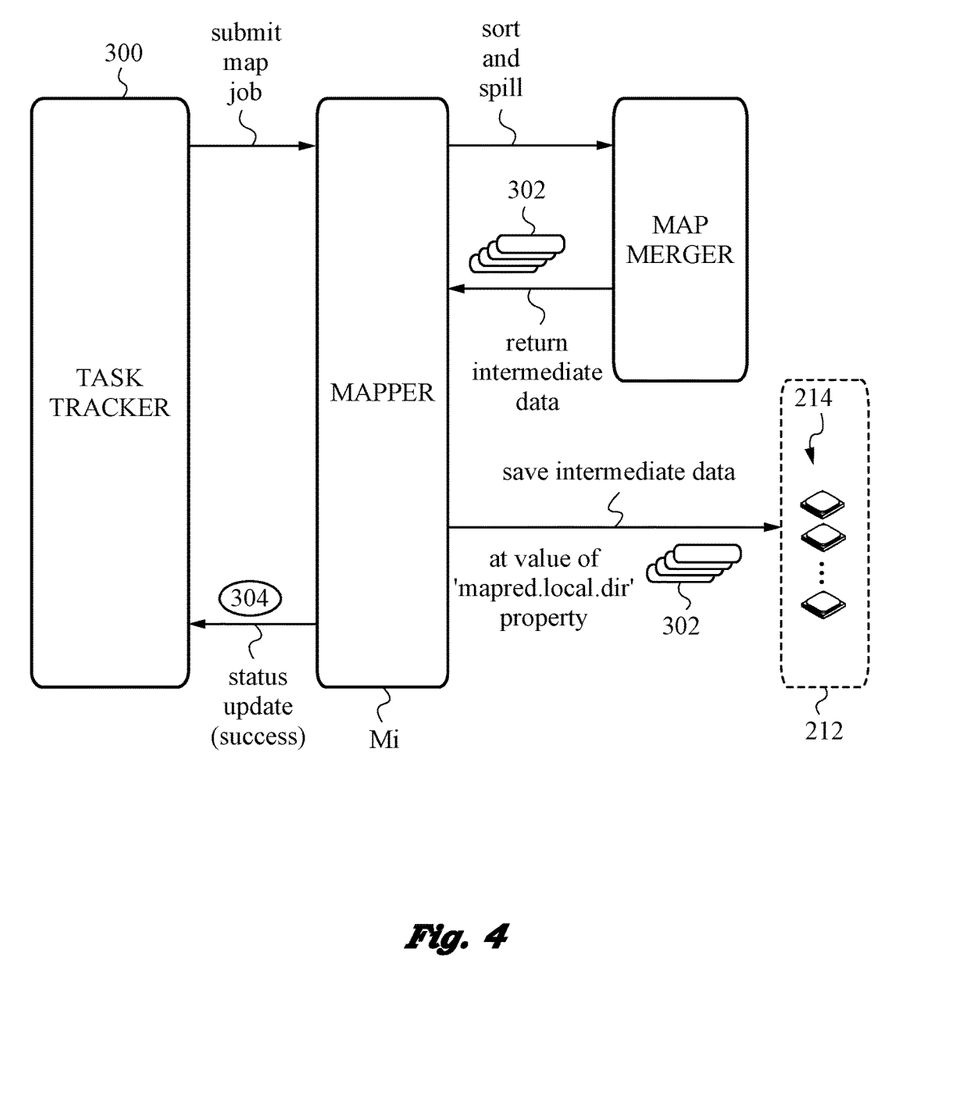
FIG. 4 is a message diagram depicting the usage of shared storage device in the system of FIG. 3

FIG. 4 is a message diagram depicting the usage of shared storage device embodied by SAN 212 by a particular map node Mi selected from among map nodes 204 shown in FIG. 3. After job submission by task tracker 300, mapper Mi processes input data, resulting in the creation of intermediate data 302 to mapper Mi. Mapper Mi can now save output files that constitute intermediate data 302 to a local directory that is mounted to a shared storage file system of SAN 212. Upon successful IC operation, mapper Mi sends a status update event 304 to task tracker 300.

Figure 5:
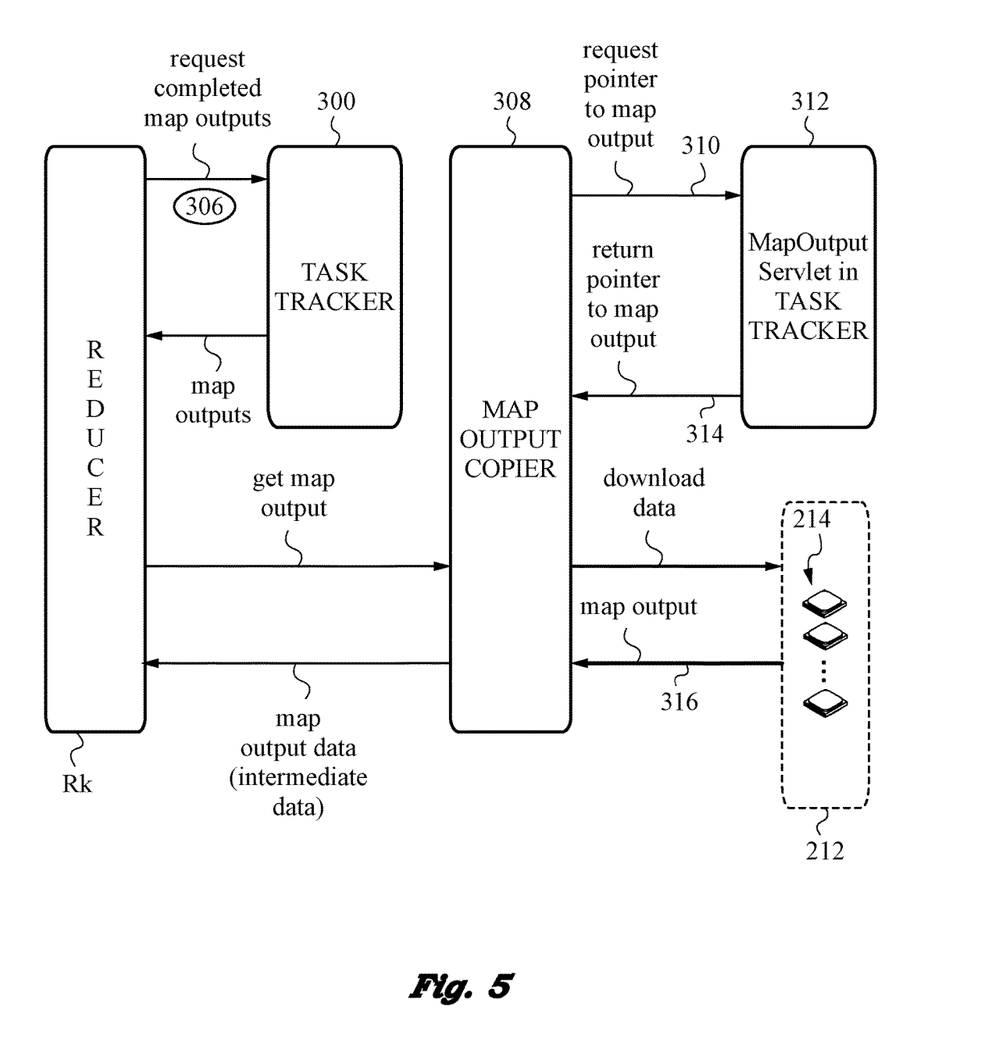
FIG. 5. is a message diagram illustrating the sequence of messages sent to facilitate intermediate data access by a reducer belonging to the system of FIG. 3.

FIG. 5 is a message diagram showing sequence of messages sent to facilitate access to intermediate data 302 by a particular reducer Rk from among reduce nodes 206 shown in FIG. 3. Reducer Rk can send a request 306 to task tracker 300 for a list of completed map tasks. The list of map task outputs is passed to MapOutputCopier class 308, which in its turn establishes an HTTP connection 310 to MapOutputServlet 312 running on task tracker 300.

This specific task tracker 300 was used to execute mapper task and save intermediate data 302. Therefore, it has information to compose a fully qualified domain name (FQDN) path to intermediate data 302 located in shared storage or SAN 212. Now, rather than having to return a potentially large amount of intermediate data 302, task tracker 300 can return an empty response with only "MAP_OUTPUT_PATH" HTTP header set 314. The value of this field can serve as a pointer to intermediate files located on shared storage device 212.

For example, set 314 can be formatted as follows:
"/mnt/shared/${hostname}/tmp/${username}/mapred/local/0_0/taskTracker/${job_id }/${atte mpt_id_m}/output/file.out"

and it can consist of FQDN path to the resource. In addition HTTP response can return custom fields such as "Raw-Map-Output-Length", "Map-Output-Length", "for-reduce-task". It should be noted, however that in order to optimize response time MapOutputServlet 312 should not try to return any custom HTTP headers with values that would require initiating network connection from task tracker 300 to shared storage device 212. Upon response from MapOutputServlet 312, MapOutputCopier 308 can extract "MAP_OUTPUT_PATH" HTTP header and use its value to establish a direct connection to shared storage device or SAN 212. All intermediate data 302 can now be downloaded directly, preferably via a fast or high-speed connection 316 with SAN 212. At the very least, it is preferable that fast connection 316 be provided to the fastest storage resources in SAN 212 where the most popular intermediate data resides.

Present method will require some modifications in Hadoop's code base, however for one skilled in the art it should be straightforward to follow aforementioned description to implement this invention.

The system of the invention can be deployed in any computer cluster or clusters that support distributed file systems. For example, computer clusters running the Hadoop Distributed File System (HDSF) are suitable candidates.

In other embodiments of the invention the cluster can be broken down into various virtual "mini-clusters" that still appear as one cluster to the operator. Such cluster segmentation is preferably managed by the cluster resource management framework. The management framework segments the cluster based on performance. For example, the fastest storage blocks are designated as cluster "A", middle storage blocks are seen as cluster "B" and the slowest are seen as cluster "C".

While there are now technically three separate clusters, they appear as one cluster from the point of view of the nodes executing the map-reduce job. Thus, when a map-reduce job is run it is still handled by the master node (also known as the NameNode) but it is isolated and runs on the appropriate cluster segment and returns the results from that segment. Jobs can still run on all segments and multiple results can be returned from all segments, with the most popular or most frequently accessed data being returned first.

In view of the above teaching, a person skilled in the art will recognize that the invention can be embodied in many different ways in addition to those described without departing from the spirit of the invention. Therefore, the scope of the invention should be judged in view of the appended claims and their legal equivalents.

We claim:

1. A distributed computer system configured for spill management during a shuffle phase of a map-reduce job performed by said distributed computer system on distributed files, said distributed computer system comprising:
   (a) key-value pairs (ki,vi) belonging to said distributed files on which said map-reduce job is performed;
   (b) a number of map nodes for performing a pre-shuffle phase of said map-reduce job on said key-value pairs (ki,vi) to generate keyed partitions (Ki,PRTj);
   (c) storage resources for spilling said keyed partitions (Ki,PRTj), said spilling managed by a spilling protocol utilizing at least one popularity attribute of said key-value pairs (ki,vi);
   (d) said popularity attribute of said key-value pairs (ki,vi) determined in accordance with at least one element selected from the group consisting of relevance ranking of said key-value pairs (ki,vi) to a topic of interest, number of times that said key-value pairs (ki,vi) are used in computations and level of trust of data sources from which said key-value pairs (ki,vi) were obtained;
   (e) a number of reduce nodes provided with said spilling protocol to enable said reduce nodes to locate and access said keyed partitions (Ki,PRTj) during said shuffle phase by utilizing a path to said keyed partitions (Ki,PRTj);
   wherein said distributed computer system executes a post-shuffle phase of said map-reduce job to produce an output of said map-reduce job.

2. The distributed computer system of claim 1, wherein said storage resources comprise heterogeneous storage resources recognized as block storage devices by said distributed computer system.

3. The distributed computer system of claim 2, wherein said heterogeneous storage resources include at least two members of the group consisting of SATA, HDD, RAID, SSD, Optical drives, Cloud, tape and general block storage devices.

4. The distributed computer system of claim 2, further comprising a tag assigned by said spilling protocol, said tag containing a logical unit number (LUN) of said block storage devices storing those amongst said keyed partitions (Ki,PRTj) that are related to most popular amongst said key-value pairs (ki,vi).

5. The distributed computer system of claim 1, wherein said distributed file system comprises a distributed file system usable by Hadoop.

6. The distributed computer system of claim 1, wherein said spilling protocol is managed by a task tracker of said map-reduce job.

7. The distributed computer system of claim 6, wherein in response to a request from one amongst said reduce nodes to said task tracker, a servlet associated with said task tracker sends a pointer to said keyed partitions (Ki,PRTj).

8. The distributed computer system of claim 1, wherein said storage resources are segmented into cluster segments and said map-reduce job is performed on each of said cluster segments.

9. The distributed computer system of claim 1, wherein said spilling protocol utilizes an assignment order to said storage resources for said spilling, based on said at least one popularity attribute.

10. The distributed computer system of claim 1, wherein said spilling protocol spills to fastest amongst said storage resources, those amongst said keyed-partitions (Ki,PRTj) that are related to most popular amongst said key-value pairs (ki,vi).

11. The distributed computer system of claim 1, wherein said output comprises partial results of said map-reduce job, and said output produced while said map-reduce job is still in progress.

12. A method for spill management during a shuffle phase of a map-reduce job that is performed on distributed files of a distributed computer system, said method comprising:
   (a) identifying key-value pairs (ki,vi) related to input data associated with said map-reduce job;
   (b) executing a pre-shuffle phase of said map-reduce job on said input data, said pre-shuffle phase performed on a number of map nodes of said distributed computer system, said pre-shuffle phase generating intermediate data;
   (c) providing a spilling protocol for said intermediate data based on at least one popularity attribute of said key-value pairs (ki,vi);

(d) determining said popularity attribute of said key-value pairs (ki,vi) in accordance with at least one element selected from the group consisting of relevance ranking of said key-value pairs (ki,vi) to a topic of interest, number of times that said key-value pairs (ki,vi) are used in computations and level of trust of data sources from which said key-value pairs (ki,vi) were obtained;

(e) spilling said intermediate data over storage resources of said distributed computer system in accordance with said spilling protocol;

(f) providing said spilling protocol to a number of reduce nodes of said distributed computer system to enable said reduce nodes to locate and access said intermediate data during said shuffle phase; and (g) performing a post-shuffle phase of said map-reduce job to produce a partial output of said map-reduce job.

13. The method of claim 12, wherein said spilling protocol utilizes an assignment order to said storage resources for said spilling, based on said at least one popularity attribute.

14. The method of claim 12, wherein said storage resources comprise heterogeneous storage resources recognized as block storage devices by said distributed computer system.

15. The method of claim 14, wherein said heterogeneous storage resources include at least two members of the group consisting of SATA, HDD, RAID, SSD, Optical drives, Cloud, tape and general block storage devices.

16. The method of claim 14, wherein said spilling protocol assigns a tag containing a logical unit number (LUN) of said block storage devices storing that portion of said intermediate data which is related to most popular amongst said key-value pairs (ki,vi).

17. The method of claim 12, wherein said distributed file system comprises a distributed file system usable by Hadoop.

18. The method of claim 12 further utilizing a search-ranking algorithm in the determination of said popularity attribute.

19. A method for spill management during a shuffle phase of a map-reduce job that is performed on distributed files in a distributed computer system, said method comprising:

(a) identifying key-value pairs (ki,vi) related to input data associated with said map-reduce job;

(b) performing on a number of map nodes of said distributed computer system a pre-shuffle phase of said map-reduce job on said input data, said pre-shuffle phase generating intermediate data;

(c) providing a spilling protocol for said intermediate data for assigning at least one popularity attribute of said key-value pairs (ki,vi);

(d) determining said popularity attribute of said key-value pairs (ki,vi) in accordance with at least two elements selected from the group consisting of search ranking of said key-value pairs (ki,vi), relevance ranking of said key-value pairs (ki,vi) to a topic of interest, number of times that said key-value pairs (ki,vi) are used in computations and level of trust of data sources from which said key-value pairs (ki,vi) were obtained;

(e) spilling said intermediate data over storage resources of said distributed computer system in accordance with said spilling protocol;

(f) providing said spilling protocol to a number of reduce nodes of said distributed computer system to enable said reduce nodes to locate and access said intermediate data during said shuffle phase; and (g) performing a post-shuffle phase of said map-reduce job for producing an output list of said map-reduce job.

20. The method of claim 19 performing said producing of said output list while said map-reduce job is still in progress, and said output list comprising partial results from said map-reduce job.

* * * * *